United States Patent [19]
Matsushita

[11] Patent Number: 4,583,072
[45] Date of Patent: Apr. 15, 1986

[54] DEVICE FOR CHECKING FILLER CAP INSTALLATION

[75] Inventor: Kiyomi Matsushita, Yokosuka, Japan

[73] Assignee: Nissan Motor Co., Ltd., Yokohama, Japan

[21] Appl. No.: 465,205

[22] Filed: Feb. 9, 1983

[30] Foreign Application Priority Data

Mar. 5, 1982 [JP] Japan .................................. 57-34941

[51] Int. Cl.$^4$ .................................. B60Q 1/00
[52] U.S. Cl. .................................. 340/52 D; 340/52 R; 340/686; 180/286
[58] Field of Search .................. 340/52 D, 52 R, 686, 340/687; 200/61.62, 61.60, 61.59; 220/DIG. 32, 33, 288, DIG. 33; 180/286, 287, 289; 362/79

[56] References Cited

U.S. PATENT DOCUMENTS

| | | | |
|---|---|---|---|
| 3,026,004 | 3/1962 | Rowell | 180/286 |
| 3,572,305 | 3/1971 | Moragne | 220/DIG. 32 |
| 3,878,507 | 4/1975 | Medlock | 340/63 |
| 3,986,634 | 10/1976 | Smith et al. | 220/288 |

*Primary Examiner*—John W. Caldwell, Sr.
*Assistant Examiner*—Tyrone Queen
*Attorney, Agent, or Firm*—Schwartz, Jeffery, Schwaab, Mack, Blumenthal & Evans

[57] ABSTRACT

A pair of first and second switches are arranged in series and operative to connect a warning lamp disposed within a passenger compartment of a vehicle to an electric power source. The first switch is adapted to close when an engine ignition system is turned on, and the second switch is adapted to close when a fuel tank filler cap is improperly installed.

2 Claims, 4 Drawing Figures

DEVICE FOR CHECKING FILLER CAP INSTALLATION

BACKGROUND OF THE INVENTION

1. Field of the Invention

The present invention relates to a device for checking to be sure that a filler cap, particularly of such a kind that is screwed into a threaded filler tube of an automobile fuel tank, is properly installed.

2. Description of the Prior Art

It is usual for a driver to leave handling of a fuel tank filler cap entirely to a gas station worker. The driver does not check the filler cap for proper installation by himself. However, it does not always follow that a gas station worker installs a filler cap properly. Should the filler cap be installed loosely, not only gasified fuel in the fuel tank would leak to contaminate the air but also such leakage of fuel would be likely to occur upon collision that causes a disastrous accident.

SUMMARY OF THE INVENTION

In accordance with the present invention, there is provided a device for checking a filler cap for proper installation. The filler cap is of the kind for installation on a fuel tank filler tube of an automotive vehicle having a passenger compartment. The device comprises a detector operative to detect whether the filler cap is properly installed and produce a signal representative of the detected installed condition, and an indicator disposed within the passenger compartment and operative to produce a signal in dependence upon the detection signal.

This device makes it quite easy for a driver to check to be sure that a filler cap is properly installed since he can do it while sitting in a driver's seat.

It is accordingly an object of the present invention to provide a device that enables a driver to check a filler cap for proper installation while sitting in a driver's seat.

It is another object of the present invention to provide a checking device of the above described character that insures the safety of an automobile fuel system.

It is a further object of the present invention to provide a combination of a particular filler cap and a device for checking the filler cap for proper installation, which combination makes it quite easy not only for a driver to check to be sure that the filler cap is properly installed but also for a gas station worker to install the filler cap to its correct position.

BRIEF DESCRIPTION OF THE DRAWINGS

The features and advantages of the checking device according to the present invention will become more clearly appreciated from the following description taken in conjunction with the accompanying drawings, in which.

DESCRIPTION OF THE PREFERRED EMBODIMENTS

Figure 1:
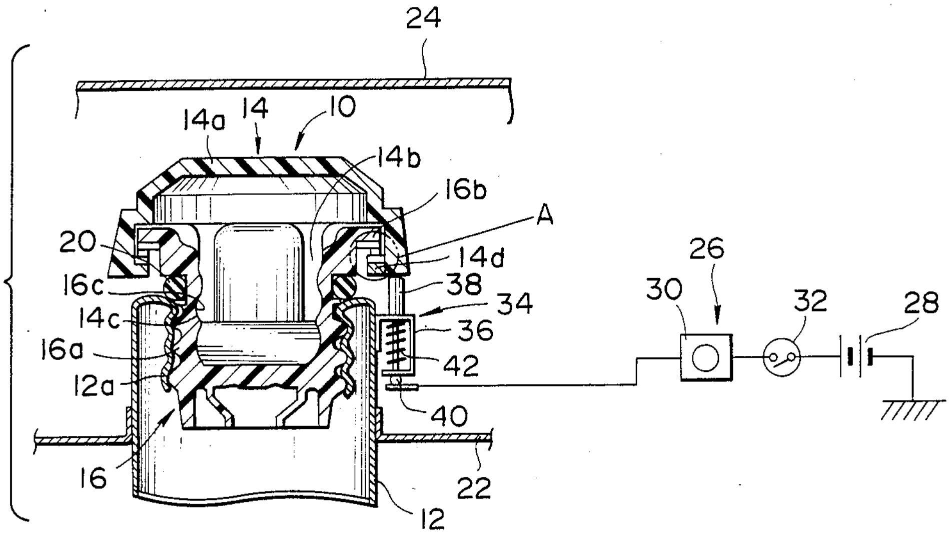
FIG. 1 is a sectional view of a filler cap and a device for checking the filler cap for proper installation according to an embodiment of the present invention.
Figure 2:
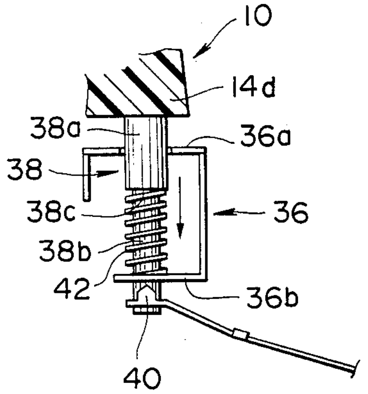
FIG. 2 is an enlarged fragmentary view of a switch utilized in the checking device of FIG. 1.

Referring now to FIGS. 1 and 2, a filler cap is generally designated by 10 and shown as being screwed into an automobile fuel tank filler tube 12 that is threaded at 12*a*. The filler cap 10 is of the kind that is provided with a ratchet that slips after the filler cap 10 is properly tightened, thereby preventing overtightening.

Figure 1A:
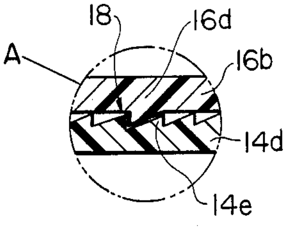
FIG. 1*a* is an enlarged fragmentary view of the rachet mechanism of the filler cap of the present invention.

More specifically, the filler cap 10 consists of a cap handle 14 and cap plug 16 that are separate or independent parts made of synthetic resin. The cap plug 16 is hollow and has a generally U-shaped longitudinal section with an outward flange 16*b* at the upper open end thereof and an inner circumferential wall formed with a plurality of axially spaced annular groove 16*c*. The cap handle 14 has a head 14*a* and a plurality of legs 14*b* that are separate from each other to have a suitable resilience and adapted to define a tube having a plurality of annular projections 14*c* that fit in the annular grooves 16*c* of the cap plug 16 when the legs 14*b* are inserted into the cap plug 16 by the effect of the resilience. With these grooves 16*c* and projections 14*c*, the cap handle 14 is coupled with the cap plug 16 in a manner to be rotatable but against axial movement relative to the cap plug 16. The head 14*a* of the cap handle 14 also has at the lower peripheral edge thereof an inward flange 14*d* that underlies the flange 16*b* of the cap plug 16. As illustrated in more detail in FIG. 1*a*, the flanges 14*d* and 16*b* are respectively formed with teeth 14*e* and 16*d* that mesh with each other and constitute such a ratchet mechanism 18 that is normally operative to transfer tightening or less tightening torque from the cap handle 14 to the cap plug 16 but slips to allow the cap handle 14 to rotate relative to the cap plug 16 only in one direction otherwise causing the cap plug 16 to be further tightened after proper tightening torque is transferred or after correct pressure is applied to a seal ring 20 that provides a seal between the cap plug 16 and the open end 12*a* of the filler tube 12.

With the above structure, tightening torque applied to the cap handle 14 is transferred through the ratchet mechanism 18 to the cap plug 16, causing the cap plug 16 to be screwed onto the threaded end 12*a* of the filler tube 12. In this instance, when the seal ring 20 placed around the cap plug 16 is subjected to a predetermined pressure, the ratchet mechanism 18 is caused to slip allowing the cap handle 14 to rotate relative to the cap plug 16, thereby preventing the filler cap 10 from being overtightened as well as indicating that the filler cap 10 is properly tightened. Designated by the reference numeral 22 is a filler base that connects the filler tube 12 to a vehicle body panel (not shown), and by 24 a filler lid closing the opening in the exterior of the vehicle body for access to the filler tube 12.

Description is now made to a device for checking the filler cap 10 for proper installation. The checking device is generally designated by 26 and shown as comprising an electric power source 28, a warning lamp 30 that glows when connected to the electric power source 28, and a pair of first and second switches 32 and 34 arranged in series with each other and operative to connect the warning lamp 30 to the electric power source 28. The first switch 32 is adapted to close when the associated engine ignition signal is turned on, i.e., when the engine is running or cranking, for instance.

The first switch 32 is therefore preferably constituted by an ignition switch. The second switch 34 is adapted to close only when the cap handle 10 is properly installed. That is, the second switch 34 is adapted to function as a detector for detecting whether the filler cap 10 is screwed to a correct position. To this end, the second switch 34 consists of a bracket 36 attached to the filler tube 12 and having a pair of parallel first and second bracket sections 36*a* and 36*b* spaced axially of the filler tube 12, a detector pin 38 reciprocative in the bracket sections 36*a* and 36*b* and having an end projecting from the first bracket section 36*a* for abutment on the flange 14*d* of the cap handle 14 and the other end projecting from the second bracket section 36*b*, a movable contact 40 mounted on the other end of the detector pin 38 and movable together therewith into and out of a position where it abuts on the second bracket section 36*b* to limit reciprocative movement of the detector pin 38, and a spring 42 urging the detector pin 38 in the direction causing the movable contact 40 to abut on the second bracket section 36*b*.

The detector pin 38 is made of a non-conductive material while the bracket 36 is made of a conductive material so that the second bracket section 36*b* functions as a stationary contact and cooperates with the movable contact 40 to constitute a switching mechanism. The detector pin 38 is of such a length as to be pushed down by the flange 14*d* of the cap handle 14 and allow the movable contact to be disengaged from the second bracket section 36*b* when the filler cap 10 is properly installed, i.e., screwed to a correct position, resulting in the opening of the second switch 34. When, on the other hand, the filler cap 10 is improperly installed or not installed, the detector pin 38 projects increasedly from the first bracket section 36*a* and allows the movable contact 40 to abut on the second bracket section 36*b* under the bias of the spring 42, resulting in the closure of the second switch 34.

The detector pin 38 is in the form of having a larger diameter section 38*a* and a smaller diameter section 38*b* to have a shoulder 38*c* therebetween. The spring 42 is shown as being a compression coil spring placed around the smaller diameter section 38*b* of the detector pin 38 in a manner to have an end seating on the second bracket section 36*b* and the other end seating on the shoulder 38*c* of the detector pin 38. The spring 42 is arranged in a loaded condition so as to constantly urge the detector pin 38 in the direction causing the movable contact 40 to abut on the second bracket section 36*b*.

The warning lamp 30 is disposed within the passenger compartment of the vehicle and preferably installed together with other instruments on the instrument panel (not shown) so that the driver can check the warning lamp while sitting in the driver's seat. In place of such a warning lamp, other warning or signaling system such as a chime or buzzer may be used to produce the same effect.

With the above structure, when the engine ignition system is turned on with the first switch 32 being closed, the warning lamp 26 glows if the filler cap 10 is improperly installed or not installed. By referring to the warning lamp, the driver sitting in the driver's seat can check to be sure that the filler cap is properly installed.

While the bracket 36 has been described and shown as being attached to the filler tube 12, it may otherwise be attached to the filler base 22. Further, the second switch 34 may otherwise be constructed and arranged to close when the filler cap 10 is properly installed for thereby allowing the warning lamp 30 to glow.

Figure 3:
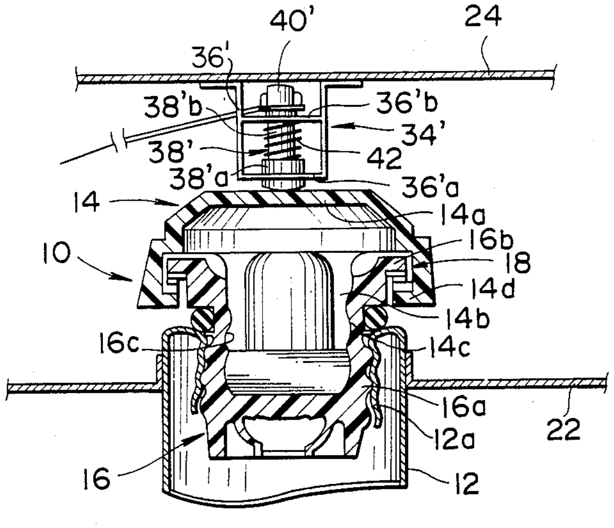
FIG. 3 is a sectional view of a filler cap and a device for checking the filler cap for proper installation according to another embodiment of the present invention.

FIG. 3 shows a modified embodiment of the present invention in which the second switch is slightly modified and generally indicated by 34'. Other parts are substantially similar to those of the preferred arrangement of FIGS. 1 and 2 and indicated by like reference numerals as their corresponding parts to FIGS. 1 and 2. The second switch 34' in this modified embodiment is mounted on the filler lid 24 and consists of a bracket 36' with a pair of parallel first and second bracket sections 36'*a* and 36'*b*, a detector pin 38' reciprocative in the bracket sections 36'*a* and 36'*b*, a movable contact 40' mounted on the detector pin 38' and operative to contact the fuel lid 24 as well as the bracket section 36'*b*, and a spring 42' urging the detector pin 38' in the direction causing the movable contact 40' to abut on the second bracket section 36'*b*.

In operation, the movable contact 40' is brought into contact with the filler lid 24 to allow the warning lamp 30 to glow if the filler cap 10 is insufficiently tightened, i.e., not screwed to a correct position and when the engine ignition system is turned on (the first switch 32 is closed). For this end, it is desirable for the movable contact 40' to be in part resiliently flexible so that it resiliently flexes when pushed by the filler lid 24. Further, the movable contact 40' is brought into contact with the second bracket sections 36'*b* to allow the warning lamp 30 to glow if the filler cap 10 is not installed and when the engine ignition switch is turned on (the first switch 32 is closed).

In this embodiment, the filler lid 24 as well as the second bracket section 36'*b* is adapted to function as a stationary contact that cooperates with the movable contact 40' to constitute a switching mechanism.

From the foregoing, it is to be understood that according to the present invention there is provided an optimal combination of a particular filler cap with a ratchet mechanism and a device for checking the filler cap for proper installation whereby it is made quite easy not only for a driver to check to be sure that the filler cap is properly installed but also for a gas station worker to install the filler cap to its correct position.

Obviously, numerous modifications and variations of the present invention are possible in light of the above teachings. It is therefore to be understood that within the scope of the appended claims, the invention may be practiced otherwise than as specifically described herein.

What is claimed is:

1. A device for checking a filler cap for proper installation to a fuel tank filler tube of an automotive vehicle having a passenger compartment and an engine ignition system, said device comprising:
- an electric power source;
- an assembly disposed within the passenger compartment and operative to produce a warning signal when connected to said electric power source;
- a pair of first and second switches connected in series circuit and operative to connect said assembly to said electric power source, said first switch being adapted to close when the engine ignition system is turned on and said second switch being adapted to close when the filler cap is improperly installed; and
- a filler cap closing an opening for access to said filler tube, wherein the filler cap includes a cap plug to be screwed into said filler tube and a cap handle drivingly connected to said cap plug, and wherein said second switch comprises a bracket attached to said filler lid, said bracket comprising a pair of parallel first and second bracket sections spaced axially of said filler tube, a detector pin reciprocative in said bracket sections and having a first end projecting from said first bracket section for abutment with said cap handle and a second end projecting from said second bracket section, a movable contact mounted on said second end of said detector pin and movable together therewith between an abutting position with said second bracket section and an abutting position with said filler cap, and a spring constantly urging said detector pin in the direction causing said movable contact to abut with said second bracket section.

2. A device as set forth in claim 1, in which said detector pin is made of a non-conductive material while said bracket is made of a conductive material so that both said filler lid and said second bracket section function as a pair of stationary contacts that cooperate with said movable contact to constitute a switching mechanism.

* * * * *